July 6, 1965   R. R. COPELAND   3,192,602
CUTTING TOOL
Filed Oct. 18, 1963

INVENTOR.
Ronald R Copeland
BY
Ralph Hammar
Attorney 3,192,602
CUTTING TOOL
Ronald R. Copeland, Diamond, Pa., assignor to Greenleaf Corporation, Pittsburgh, Pa., a corporation of Pennsylvania
Filed Oct. 18, 1963, Ser. No. 317,198
3 Claims. (Cl. 29—96)

This invention is an indexable bit cutting tool in which the bit is clamped between a center pin and a wedge engaging an inactive edge of the bit.

Figure 1:
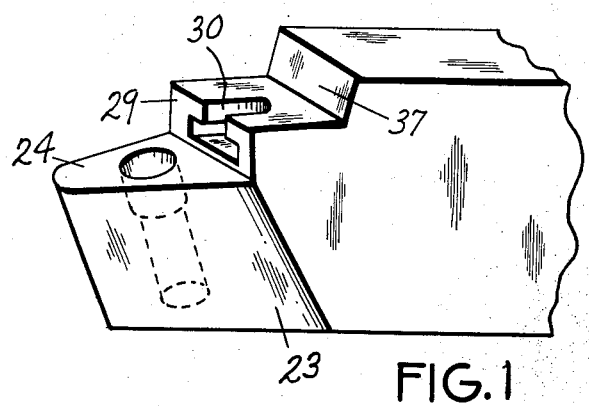
Figure 2:
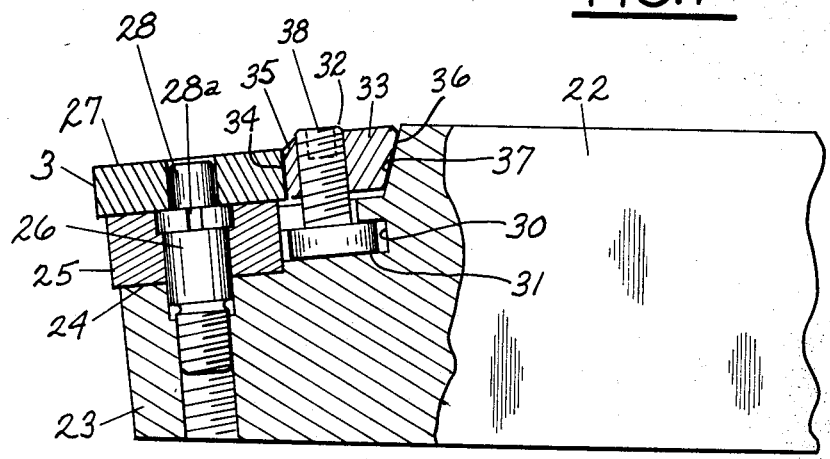
Figure 4:
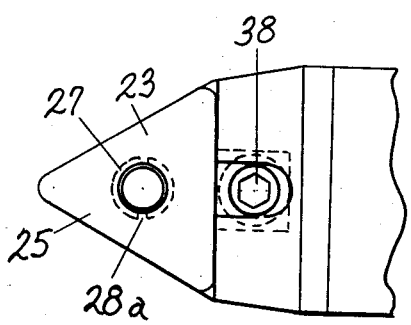
Figure 3:
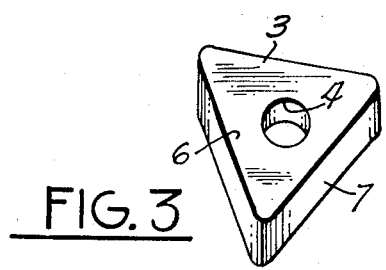

In the drawing, FIG. 1 is a perspective of the bit supporting section of the tool, FIG. 2 is a side elevation of a cutting tool partly in section, FIG. 3 is a perspective of a triangular bit, and FIG. 4 is a top plan view of the bit supporting section with the bit removed.

The invention is shown applied to a single point cutting tool using triangular bits although it is obviously applicable to multiple point cutting tools and to tools using bits of other polygonal shapes.

The triangular bit 3 is of the type having a central hole 4 perpendicular to the end faces 5 and 6 of the bit and parallel to the side edges 7.

The tool has a body 22 with a head 23 at the front having a step 24 on which is seated an anvil or bit seat member 25. The anvil is clamped solidly against the step 24 by a screw 26 having a head 27 with slots 28a for a special wrench for tightening the screw. When tightened, the head 27 is recessed below the upper surface of the anvil 25 and pulls the anvil tightly against the seat 24, taking up all lost motion. Integral with the upper end of the head 27 is a pin 28 of height slightly less than the thickness of the bit 3. The pin 28 is received in the center hole of the bit. At the rear of the step 24 is a riser 29 through which extends a T-slot 30 receiving the head 31 of a screw 32. The screw is threaded into a clamp 33 having its front edge 34 engaging the edge 35 of the bit and having its back edge 36 engaging a riser 37 lying in a plane parallel to and inclined downwardly at a wedging angle toward the inactive edge 35 of the bit. The upper end of the screw 32 is provided with a socket 38 for a wrench. As the screw is tightened, the clamp 33 is moved downward parallel to the edge 35 of the bit and at the same time is moved forward by the inclined riser 37. This exerts a force moving the bit 3 forward and clamping it solidly against the pin 28. Upon loosening the screw, the clamp 33 is moved upward to relieve the clamping pressure to permit easy indexing of the bit to a new cutting position.

The structure permits locating the clamping screw closer to the bit. It also permits the riser 37 to have a greater angle of inclination. The holes for the screws 25 and 32 are parallel to each other. The floating of the screw 32 in the undercut slot 30 eliminates binding of the clamp. A further advantage is that the screw 32 moves the clamp 33 down parallel to the inactive edge 35 of the bit 3, eliminating any possibility of a localized force which would tip the front end of the bit upward as the clamp is tightened. Since the screw 32 floats in the T-slot, as the screw is tightened, the clamp 33 is free to move downward parallel to the rear edge of the bit 3 and cannot cause the front end of the bit to tilt upward. The requirement for precise location of the screw is eliminated, thus simplifying the manufacture.

The upper surface of the bit 3 is unobstructed and the bit is solidly clamped edgewise against the pin and is precisely located so that the relative position of the active cutting edge does not change as the bit is indexed to bring a new edge into active cutting position.

What is claimed as new is:

1. An indexable bit cutting tool having a head with a step at the front and a riser at the rear of the step, a polygonal anvil mounted on the step having a pin upstanding above and perpendicular to the upper surface of the anvil, a T-slot extending rearwardly through the riser opposite the rear edge of the anvil, said anvil having its rear edge presented to the riser and blocking the T-slot, an indexable polygonal bit seated on the anvil and having a center hole telescoped over said pin and having an active edge in cutting position and an inactive edge to the rear of said active edge, said head having an upstanding shoulder to the rear of the T-slot lying in a plane inclined downwardly at a wedging angle toward said inactive edge of the bit, a clamp having its front edge engaging said inactive edge of the bit and its back edge engaging said shoulder, and a screw threaded in the clamp having its head in the T-slot for tightening the clamp to wedge the bit between the pin and the front edge of the clamp.

2. An indexable bit cutting tool having a head with a step at the front and a riser at the rear of the step, a polygonal anvil mounted on the step having a central hole countersunk below its upper surface, a screw extending through said hole for clamping the anvil to the step, said screw having an integral pin upstanding above and perpendicular to the upper surface of the anvil, a T-slot extending rearwardly through the riser opposite the rear edge of the anvil, said anvil having its rear edge presented to the riser and blocking the T-slot, an indexable polygonal bit seated on the anvil and having a center hole telescoped over said pin and having an active edge in cutting position and an inactive edge to the rear of said active edge, said head having an upstanding shoulder to the rear of the T-slot lying in a plane inclined downwardly at a wedging angle toward said inactive edge of the bit, a clamp having its front edge engaging said inactive edge of the bit and its back edge engaging said shoulder, and a screw threaded in the clamp having its head in the T-slot for tightening the clamp to wedge the bit between the pin and the front edge of the clamp.

3. An indexable bit cutting tool having a head with a step at the front and a riser at the rear of the step, a polygonal anvil mounted on the step having a pin upstanding above and perpendicular to the upper surface of the anvil, an undercut slot extending rearwardly through the riser opposite the rear edge of the anvil, said anvil having its rear edge presented to the riser and blocking the slot, an indexable polygonal bit seated on the anvil and having a center hole telescoped over said pin and having an active edge in cutting position and an inactive edge to the rear of said active edge, said head having an upstanding shoulder to the rear of the slot, a clamp having its front edge engaging said inactive edge of the bit and its back edge engaging said shoulder for wedging the bit between the pin and the front edge of the clamp, and a clamping screw having its head in the slot for tightening the clamp.

(References on following page)

References Cited by the Examiner

UNITED STATES PATENTS

| | | | |
|---|---|---|---|
| 1,056,089 | 3/13 | Conklin | 29—105 X |
| 1,311,897 | 8/19 | Ihrmark | 29—96 |
| 1,493,626 | 5/24 | Gebhardt | 29—105 X |
| 2,245,446 | 6/41 | Sheldrick | 29—105 |
| 2,306,798 | 12/42 | Benninghuff | 29—105 |
| 2,665,893 | 1/54 | Ball | 29—105 X |
| 2,842,233 | 7/58 | Greenleaf | 29—105 X |
| 3,059,316 | 10/62 | Bader | 29—96 |

FOREIGN PATENTS

| | | |
|---|---|---|
| 647,021 | 8/62 | Canada. |
| 239,258 | 9/25 | Great Britain. |

OTHER REFERENCES

Russian Carbides Compared with Western Products, an article from Metalworking Production Magazine of August 2, 1961, pages 11 and 12.

WILLIAM W. DYER, JR., *Primary Examiner*.